United States Patent [19]

Schmitt et al.

[11] 4,095,018
[45] June 13, 1978

[54] N,N-BIS-HYDROXYALKYL-3,5-DI-T-BUTYL ANILINES ACCELERATORS FOR REDOX POLYMERIZATION OF UNSATURATED COMPOUNDS

[75] Inventors: Werner Schmitt; Robert Purrmann, both of Starnberg; Peter Jochum, Hechendorf, all of Germany

[73] Assignee: ESPE Fabrik Pharmazeutischer Praparate GmbH, Germany

[21] Appl. No.: 751,726

[22] Filed: Dec. 17, 1976

[30] Foreign Application Priority Data

Dec. 24, 1975 Switzerland .................. 16787/75

[51] Int. Cl.² .............. C08F 4/40; C08F 20/04; C08F 20/10; C08F 20/14
[52] U.S. Cl. .................. 526/211; 260/47 UA; 260/276; 526/317; 526/328; 526/329.7
[58] Field of Search ............................ 526/211

[56] References Cited

U.S. PATENT DOCUMENTS

| 2,558,139 | 6/1951 | Knock et al. | 526/211 |
| 3,799,985 | 3/1974 | Erickson | 526/211 |

Primary Examiner—Harry Wong, Jr.

Attorney, Agent, or Firm—Burns, Doane, Swecker & Mathis

[57] ABSTRACT

An improvement in the redox polymerization of unsaturated compounds, e.g., acrylic or methacrylic acids or their ester derivatives, using novel accelerators is disclosed. The polymerization is performed utilizing as the accelerator N,N-bis-hydroxyalkyl-3,5-di-t-butyl anilines having the structural formula

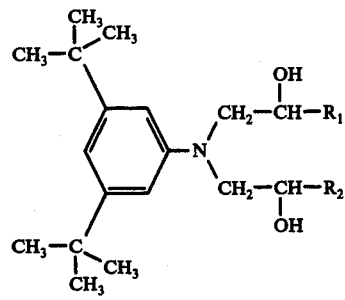

wherein $R_1$ and $R_2$ are the same or different and are H or a lower alkyl group having 1 to 4 carbon atoms. The resulting polymers are highly resistant to discoloration.

5 Claims, No Drawings

N,N-BIS-HYDROXYALKYL-3,5-DI-T-BUTYL ANILINES ACCELERATORS FOR REDOX POLYMERIZATION OF UNSATURATED COMPOUNDS

BACKGROUND OF THE INVENTION

The polymerization of ethylene unsaturated monomer compounds, e.g., the polymerization of styrene, acrylic acid or methacrylic acid or their ester derivatives as well as the hardening of polyfunctional acrylic acid esters or methacrylic acid esters, are initiated by free radicals. These free radicals can be formed, among other methods, by means of redox systems based on organic peroxide compounds. Aromatic tertiary amines have proven themselves as suitable accelerators for this redox polymerization. In particular, dialkylated anilines are used as such amine accelerators in polymerization by means of peroxides. However, in the production of polymer materials based on polyfunctional acrylic acid esters, which are used, among other things, in dentistry as tooth filling materials or for purposes of dental prosthesis, it has been shown that especially the formerly much-used diethyl aniline, as well as hydroxyalkylated aniline derivatives, leads after a time, often only one or two years, to a discoloration of the polymers. This is especially troubling in the use of these substances for dental fillings in the front of the mouth. From U.S. Pat. No. 3,541,068 it is known that N,N-bis-(hydroxyalkyl)-3,5-xylidines are especially suitable accelerators for the polymerization of acrylic or methacrylic esters of aromatic or aliphatic di- or trioles. But after a time, the products made with these special amines also show discoloration.

Because of the great variety of substances which are used in human nutrition, the precise mechanism for the discoloration of polymers in dental fillings produced from unsaturated monomers by means of an amine-activated redox polymerization presents a very difficult problem to solve which is all the more difficult as the accompanying processes and chemical changes of the material have not yet been fully explained. Since these accelerators exhibit basic characteristics, acidic, colored food substances can enter into saline or complex unions with the amines which have remained in the polymeric material. There is also the possibility that these amines themselves may change in the course of time through oxidative processes and that coloring compounds may results. Because of these problems, there is a disinclination to use these amine accelerators at all in redox systems to produce polymers in which discoloration is disadvantageous.

OBJECTS AND SUMMARY OF THE INVENTION

It is an object of this invention to avoid or alleviate the above-identified problems of the prior art.

It is also an object of this invention to provide an accelerator for use in a redox system for the polymerization of unsaturated compounds which does not tend to induce discoloration of the resulting polymer.

It is further an object of this invention to provide a method for the redox polymerization of unsaturated compounds utilizing a novel accelerator to produce polymers which are resistant to discoloration.

In one aspect, the present invention provides in a method for the redox polymerization of unsaturated compounds, the improvement which comprises using as the accelerator in said polymerization N,N-bis-hydroxyalkyl-3,5-di-t-butyl anilines having the structural formula

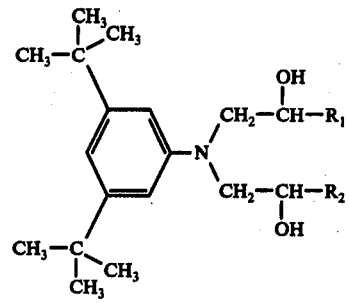

wherein $R_1$ and $R_2$ are the same or different and are H or a lower alkyl group having 1 to 4 carbon atoms.

In another aspect, the present invention provides a compound suitable to use as an accelerator in the redox polymerization of unsaturated compounds comprising N,N-bis-hydroxyalkyl-3,5-di-t-butyl anilines having the structural formula

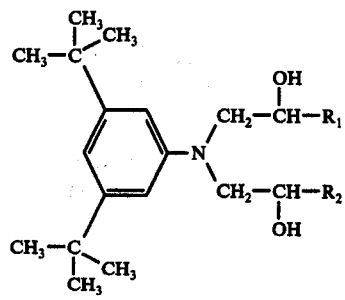

wherein $R_1$ and $R_2$ are the same or different and are H or a lower alkyl group having 1 to 4 carbon atoms.

It is now been surprisingly established that when the dihydroxyalkylated aniline derivative has a t-butyl group in both the 3- and 5-position, practically no discoloration occur even after an extended period.

DESCRIPTION OF THE PREFERRED EMBODIMENTS

According to the discovery of the present invention, the redox polymerization of ethylene unsaturated compounds is conducted using as an accelerator N,N-bis-hydroxyalkyl-3,5-t-butyl aniline having the following formula

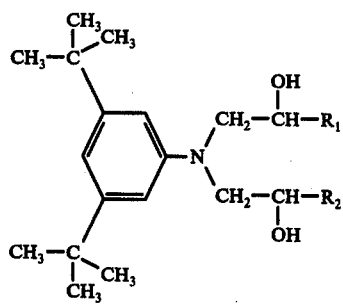

in which $R_1$ and $R_2$ are the same or different and are H or a lower alkyl group having 1 to 4 carbon atoms.

The di-t-butyl-substituted aniline derivatives used according to the discovery can be added to the reaction mixture to be polymerized in the usual concentration of 0.1–5 preferably 0,2–2% by weight in relation to the monomer. They effect the desired activation and acceleration of the peroxide-initiated polymerization in the same way as the hitherto used aniline derivatives. The organic peroxides serving as reaction partners with the di-t-butyl-substituted aniline derivatives should be present in a concentration of 0.2–4% by weight, preferably 0.5–2%.

The novel accelerators of the present invention have proven to be especially useful in the polymerization of hardenable dental materials based on methacrylic acid esters, as described for example in U.S. Pat. No. 3,066,112 as well as in West German Pat. Nos. 1,921,869 and 2,411,760. Examples of these methacrylic acid ester compounds used in dentistry are the following substances: 2,2-bis-[p-(γ-hydroxy-propoxy)phenyl]-propanedimethacrylate, 2,2-bis[p-(β-hydroxy-propoxy-)phenyl]-propanedimethacrylate, the reaction product of bisphenol A with glycidylmethacrylate, butane diol-1,4-dimethacrylate and trimethylolpropane trimethacrylate. Mixtures of these ester compounds can also be easily and rapidly co-polymerized and hardened by means of peroxides using the novel accelerators of the present invention with color-fast, cross-linked polymers being formed.

The materials to be polymerized can contain the customarily used filler materials, pigments, stabilizers and also disinfectants. For use in the dental field, both organic fillers such as pulverized polyacrylates and inorganic fillers such as pulverized quartz or glass, silicon dioxide or aluminum oxide powder, respectively, may be included.

The di-t-butyl-substituted anilines of the present invention are novel compounds. They can easily be obtained from 3,5-di-t-butyl aniline through the introduction of oxyalkyl groups onto the amine group. For the production of N,N-dihydroxypropyl-3,5-di-t-butyl aniline, the 3,5-di-t-butyl aniline is reacted with propylene oxide. For example, when 103 g. 3,5-di-t-butyl aniline are heated with 74 g. propylene oxide in an autoclave for 22 hours at 110° C and the reaction product then recrystallized several times from hexane until the melting point no longer changes, 49 g. N,N-bis-(β-hydroxypropyl)-3,5-di-t-butyl aniline (melting point 139° C.) is obtained. In the same way, with the addition of butylene oxide or ethylene oxide the following compounds are obtained:

N,N-bis-(β-hydroxybutyl)-3,5-di-t-butyl aniline (m.p. 122° C.)

N,N-bis-(β-hydroxyethyl)-3,5-di-t-butyl aniline (m.p. 93° C.)

Because of the significance of color stability in the dental field, the use of the di-t-butyl-substituted amine accelerators of the present invention is especially useful in the production of prosthetic parts, such as dentures or filling materials as set forth in the following Examples. However, it is, of course, also possible to employ these components in the peroxide-initiated production of other types of polymers in which stability against discoloration of the material is equally significant, as, for example, in transparent polyacrylates which are used as organic glass material.

The invention is additionally illustrated in connection with the following Examples which are to be considered as illustrative of the present invention. It should be understood, however, that the invention is not limited to the specific details of the Examples.

EXAMPLE 1

Production of a dental prosthesis through redox polymerization

Into a liquid mixture of 98 parts by weight methyl methacrylate (stabilized with 100 ppm p-methoxyphenol), 2 parts by weight ethylene glycol dimethacrylate, 1.4 parts by weight N,N-bis-(β-hydroxybutyl)-3,5-di-t-butyl aniline and 0.1 parts by weight 2-(2'-hydroxy-5'-methyl-phenyl)-benzotriazene are mixed, in the usual manner, beads of polymethyl methacrylate (containing 0.5% benzoyl peroxide) which have been dyed the color of gums, in the ratio of 1:2. The pasty mass obtained is inserted into a prepared mold. After approximately forty-five minutes the denture is removed and worked in the conventional manner.

The discoloration of the denture on prolonged preservation in water at 36° C. is significantly less than that of dentures which have been produced from ordinary commercial preparations, which contain p-tolyl-diethanol amine as an accelerator instead of the di-t-butyl-substituted anilines of the present invention.

EXAMPLE 2

Production of an organic glass

The 2,2-bis-p-(γ-hydroxy-propoxy)-phenyl-propanedimethacrylate used in this and in Examples 3 and 4 as a monomer is produced as described in West German Pat. No. 1,921,869, Example 10.

Into two equal parts of the monomer compounds, which has been stabilized with 100 ppm p-methoxyphenol, are dissolved 1.0% benzoyl peroxide and 0.8% N,N-bis-(β-hydroxybutyl)-3,5-di-t-butyl aniline respectively. By mixing both solutions and pouring them into suitable molds, an organic glass of excellent surface hardness and good color stability even on prolonged illumination, e.g., through exposure to the sun, is obtained within a few minutes.

EXAMPLE 3

Production of a tooth filling material in paste form

Paste A: 100 parts by weight of the dimethacrylate of Example 2 are mixed with 1.1 parts by weight N,N-bis-(β-hydroxyethyl)-3,5-di-t-butyl aniline and 0.1 parts by weight 2-(2'-hydroxy-5'-methyl-phenyl)-benzotriazene and kneaded with 400 parts by weight quartz powder which has been pigmented the color of teeth. The quartz powder has a grain size less than 60 microns and has been silanized in the usual manner with trimethoxymethacroxyloxypropylsilane.

Paste B: 100 parts by weight of the dimethacrylate of Example 2 are mixed with 0.1 parts by weight 2-(2'-hydroxy-5'-methyl-phenyl)-benzotriazine and also kneaded with 400 parts by weight uncolored silanized quartz and which contains 0.65% benzoyl peroxide.

By mixing equal parts of the two pastes a material is obtained which after being placed in a dental caries gels in about two minutes and in five minutes is essentially hardened.

The polymerizate obtained is especially color-fast both on prolonged preservation under water at 36° and on irradiation with long-wave ultra-violet light.

EXAMPLE 4

Production of a tooth filling material in pre-dosed form

| Solution | | |
|---|---|---|
| Composition: | dimethacrylate monomer | 100 parts by weight |
| | N,N-bis-(β-hydroxyethyl)-3,5-di-t-butyl aniline | 0.5 parts by weight |
| | 2-(2'-hydroxy-5'-methyl-phenyl)-benzotriazene | 0.1 parts by weight |
| Powder | | |
| Composition: | tooth-colored quartz (grain size less than 60 microns, silanized in the conventional manner) | 100 parts by weight |
| | benzoyl peroxide | 0.3 parts by weight |

The solution and powder are mixing in a mixing vessel as described in West German Pat. No. 1,566,294. A 90mg. portion of the solution is placed in a foil envelope made from polyethylene-backed aluminum and placed in the cover of the mixing vessel. The main chamber of the mixing vessel is charged with 320 mg. of the above-mentioned powder. By turning the cover the foil is destroyed and the liquid emptied into the mixing chamber. The powder and liquid are mixed for 10 seconds with a blender common in the practice of denistry. A paste is obtained which is comparable with the product from Example 3 in its setting behavior and the properties of the polymer obtained therefrom.

EXAMPLE 5

The procedure of Example 4 is utilized except that a mixture of the reaction product of bisphenol A with glycidylmethacrylate according to U.S. Pat. No. 3,066,112 and trimethylolpropane trimethacrylate and ethyleneglycol dimethacrylate in the ratio 70:15:15 is used instead of the dimethacrylate of Example 2. The paste obtained is likewise well-suited for the production of dental fillings and yields extremely color-fast polymers after hardening.

COMPARATIVE EXAMPLE

To compare the color stability of the polymers produced according to the discovery of the present invention with the present state of the technology, 1% solutions of the following amines are produced using the dimethacrylate monomer described in Example 2:

A: p-tolyl-diethanol amine (present state of the technology)

B: N,N-bis-(β-hydroxyethyl)-3,5-xylidine (present state of the technology)

C: N,N-bis-(hydroxybutyl)-3,5-di-t-butyl aniline (according to the discovery of the present invention)

D: N,N-bis-(β-hydroxyethyl)-3,5-di-t-butyl aniline (according to the discovery of the present invention)

The amine solutions are each mixed with a 1% solution of p-chlorobenzoyl peroxide in the same dimethacrylate in the ratio 1:1 and immediately placed in chromium-plated molds which permit the production of cylinders 6 mm. in diameter and 12 mm. high. After one hour, the cylinders are removed from the molds and placed in water at 50° C. For control, correspondingly molded specimens are stored in the dark at −18° C. in order to guarantee absolute color stability. On visual inspection after 30 days, it may be seen that the test specimens stored at 50° C. which were produced from mixtures C and D are only minimally colored green-yellow, whereas the specimens from B are approximately three times as strongly discolored and those from A, approximately five times as strongly discolored, a distinct brown tinge being perceptible.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. In a method for the redox polymerization of unsaturated compounds, the improvement which comprises using as the accelerator in said polymerization N,N-bis-hydroxyalkyl-3,5-di-t-butyl anilines having the structural formula

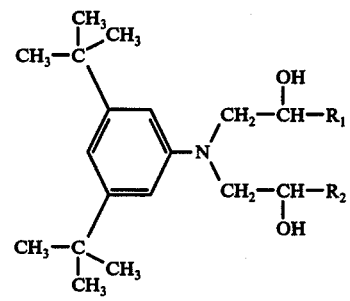

wherein $R_1$ and $R_2$ are the same or different and are H or a lower alkyl group having 1 to 4 carbon atoms.

2. The method of claim 1 wherein at least one of $R_1$ and $R_2$ are ethyl groups.

3. The method of claim 1 wherein at least one of $R_1$ and $R_2$ are hydrogen.

4. The method of claim 1 wherein $R_1$ and $R_2$ are the same and are each an ethyl group.

5. The method of claim 1 wherein the unsaturated compounds are acrylic or methacrylic acids or ester derivatives thereof.

* * * * *